Feb. 20, 1962    R. HAPPE    3,021,723
SPINDLE LOCKING MEANS FOR PORTABLE TOOLS
Filed Sept. 10, 1958
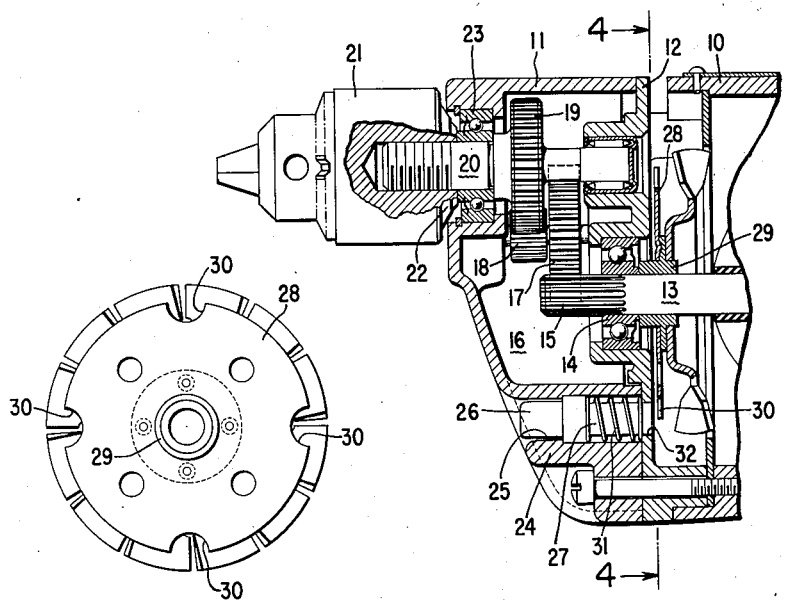
Fig.1
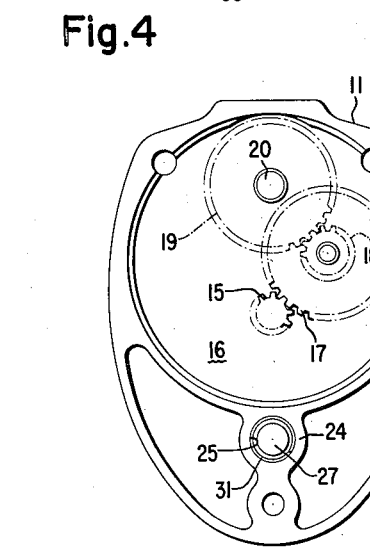
Fig.2
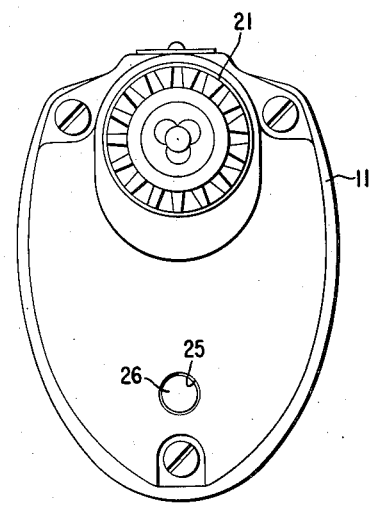
Fig.3
Fig.4
INVENTOR.
Reynold Happe
BY
Marshall J. Breen
ATTORNEY
WITNESS
William Martino

United States Patent Office 3,021,723
Patented Feb. 20, 1962

3,021,723
SPINDLE LOCKING MEANS FOR
PORTABLE TOOLS
Reynold Happe, Princeton, N.J., assignor to Diehl Manufacturing Company, Somerville, N.J., a corporation of New Jersey
Filed Sept. 10, 1958, Ser. No. 760,264
2 Claims. (Cl. 74—527)

This invention relates to portable tools having power take-off spindles threaded to receive screw-on tool-holding elements and more particularly relates to selective means for locking said spindles against rotation to facilitate the removal and securement of the tool-holding elements.

It is frequently desirable to remove conveniently the conventional key chuck from the power spindle of portable electric drills to enable other elements to be attached as desired. The compact design of modern portable electric drills is such that the chuck is screwed up tight against the inner race of the spindle bearing with the result that the spindle cannot be reached externally for holding relative to the chuck. It is common practice to use a manually operated plunger working through the wall of the grease-containing portion of the gear housing to engage an apertured gear but this gives rise to difficulties of sealing against leakage past the plunger of lubricant without detriment to the free operation of the plunger.

This problem has been solved according to the present invention by providing in the gear housing a separate grease-containing cavity, an apertured portion in a region outside said cavity, an externally-actuated plunger working in said apertured portion and through a cover for said cavity to engage peripheral notches in a disc secured to the motor shaft.

It is, therefore, an object of this invention to provide a simple and effective spindle locking means for a portable tool which means shall not require lubricant seals for its leak-free operation.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings:

FIG. 1 is a longitudinal sectional view taken through a tool embodying the invention.

FIG. 2 is an elevational view taken on the inside of the gear housing with the cover removed.

FIG. 3 is an external front end elevational view of the tool of FIG. 1.

FIG. 4 is a detailed view of the locking disc taken in the direction of the arrows 4—4 of FIG. 1.

Referring to FIG. 1, 10 denotes a motor housing, 11 is a gear housing and 12 is a gear housing cover all assembled together in line to form the tool body of a portable electric drill.

A motor shaft 13 journaled in a bearing 14 held in the cover 12 is formed with a splined terminal portion 15 which extends into a separate grease-containing cavity 16 to mesh with a gear 17. A pinion 18 rotatable with the gear 17 meshes with a gear 19 secured upon a tool spindle 20.

Theaded onto the spindle 20 is a conventional key-type chuck or tool-holder 21 with a reduced shank portion 22 held tightly against the inner race of a bearing 23. It is evident that the spindle 20 is not available externally for holding against rotation.

A boss 24 formed in a portion of the gear housing outside the grease-containing cavity 16 is apertured at 25 to receive a plunger 26 having a shank portion 27 which works endwise through an aperture 32 in the cover 12. A disc 28 spot welded to a fan hub 29 secured to the shaft 13 is formed with spaced peripheral notches 30 which may be engaged by the shank portion 27 of the plunger 26 when the latter is pressed in against the retractile force exerted by a compression spring 31. This action locks the motor shaft 13 against rotation and, through the gear train, holds the spindle 20 stationary so that the chuck 21 may be unscrewed and a different tool-holding element may be substituted therefor.

It will be noted that, by confining the grease and gears within a closed cavity 16 removed from the region of the plunger 26, the usual problem of grease leakage between the plunger and its bearing walls is entirely eliminated and without increasing the dimensions of the tool except for a slight increase in length occasioned by the minimal space required by the addition of the thin disc 28.

Having thus described the nature of the invention, what I claim herein is:

1. A spindle locking device for a portable electric tool having a gear housing, a gear containing cavity formed in said gear housing, a cover for said cavity, a power take-off spindle journaled in said housing and a motor shaft journaled in said cover and having a terminal portion extending into said cavity, comprising a gear transmission within said cavity drivably connecting the motor shaft with the power take-off spindle, a disc secured to said shaft externally of said cavity but internally of said tool, peripheral notches formed in said disc, and a spring-retracted plunger manually operative through an aperture in said gear housing and in said cover in a region outside said cavity for selectively engaging one of said notches to hold the shaft and thus the spindle against rotation.

2. In a portable electric tool having a power take-off spindle with screw-on tool-holding means, a gear housing, a gear-containing cavity formed in said gear housing, a cover for said cavity, a motor shaft journaled in said cover and extending into said cavity, a spindle locking device comprising a gear transmission within said cavity drivably connecting the motor shaft with the power take-off spindle, a disc secured to said shaft externally of said cavity, peripheral notches formed in said disc, and a spring retracted plunger manually operative externally of said tool for endwise reciprocative motion through an apertured portion of said gear housing and of said cover in a region removed from said cavity selectively to engage said notches and restrain said shaft and thus the spindle against rotation.

References Cited in the file of this patent

UNITED STATES PATENTS

| 447,607 | Gleason | Mar. 3, 1891 |
| 1,330,860 | Gale | Feb. 17, 1920 |
| 1,393,051 | Tamborello | Oct. 11, 1921 |
| 2,407,696 | Webster | Sept. 17, 1946 |
| 2,481,638 | Borup | Sept. 13, 1949 |
| 2,716,555 | Rowe | Aug. 30, 1955 |
| 2,777,340 | Hettwer et al. | Jan. 15, 1957 |
| 2,790,365 | Bunting | Apr. 30, 1957 |
| 2,872,197 | Happe | Feb. 3, 1959 |
| 2,876,369 | Doerner | Mar. 3, 1959 |

FOREIGN PATENTS

| 220,855 | Great Britain | Aug. 11, 1924 |
| 260,558 | Great Britain | Jan. 13, 1927 |